(12) United States Patent
Liu et al.

(10) Patent No.: US 8,650,025 B2
(45) Date of Patent: *Feb. 11, 2014

(54) METHOD AND APPARATUS FOR DETERMINING TEXT PASSAGE SIMILARITY

(75) Inventors: Weiquan Liu, Beijing (CN); Joe F. Zhou, Beijing (CN)

(73) Assignee: Intel Corporation, Santa Clara, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/356,000

(22) Filed: Jan. 23, 2012

(65) Prior Publication Data

US 2012/0123768 A1    May 17, 2012

Related U.S. Application Data

(63) Continuation of application No. 12/853,034, filed on Aug. 9, 2010, now Pat. No. 8,117,025, which is a continuation of application No. 10/130,858, filed on Oct. 17, 2003, now Pat. No. 7,778,817.

(51) Int. Cl.
*G06F 17/27* (2006.01)

(52) U.S. Cl.
USPC .............................................. 704/9

(58) Field of Classification Search
USPC ........................................ 704/7–9
See application file for complete search history.

(56) References Cited

U.S. PATENT DOCUMENTS

| | | | |
|---|---|---|---|
| 5,297,039 A | 3/1994 | Kanaegami et al. | |
| 5,440,663 A | 8/1995 | Moese et al. | |
| 5,956,726 A | 9/1999 | Aoyama et al. | |
| 7,778,817 B1 | 8/2010 | Liu et al. | |
| 8,117,025 B2 * | 2/2012 | Liu et al. | 704/9 |
| 2003/0004716 A1 | 1/2003 | Haigh et al. | |

FOREIGN PATENT DOCUMENTS

| | | |
|---|---|---|
| CN | 1216137 A | 5/1999 |
| EP | 0583559 A1 | 2/1994 |
| WO | 02/29618 A1 | 4/2002 |

OTHER PUBLICATIONS

Office Action received for U.S. Appl. No. 10/130,858, mailed on Feb. 21, 2008.
Office Action received for U.S. Appl. No. 10/130,858, mailed on Dec. 11, 2008.
Notice of Allowance received for U.S. Appl. No. 10/130,858, mailed on Apr. 5, 2010.
Office Action received for U.S. Appl. No. 10/130,858, mailed on Mar. 11, 2009.

(Continued)

*Primary Examiner* — Angela A Armstrong
(74) *Attorney, Agent, or Firm* — Shireen Irani Bacon

(57) ABSTRACT

According to one embodiment of the invention, a method classifying a number of noun phrases in a first text passage and a second text passage into a number of classifications. The method also includes determining a similarity between a noun phrase from the first text passage and a noun phase from the second text passage for each of the noun phrases of a same classification. Additionally, a similarity between a sentence from the first text passage and a sentence from the second text passage is determined for each of the sentences in the first and second text passages based on similarities between the noun phrases. The method also includes determining a similarity between the first text passage and the second text passage based on a similarity between sentences.

18 Claims, 3 Drawing Sheets

(56) References Cited

OTHER PUBLICATIONS

Office Action received for U.S. Appl. No. 10/130,858, mailed on May 29, 2008.
Office Action received for U.S. Appl. No. 10/130,858, mailed on Apr. 9, 2007.
Office Action received for U.S. Appl. No. 10/130,858, mailed on Jul. 30, 2007.
International Search Report and Written Opinion received for PCT Patent Application No. PCT/CN00/00300, mailed on Dec. 21, 2000, 2 pages.

* cited by examiner

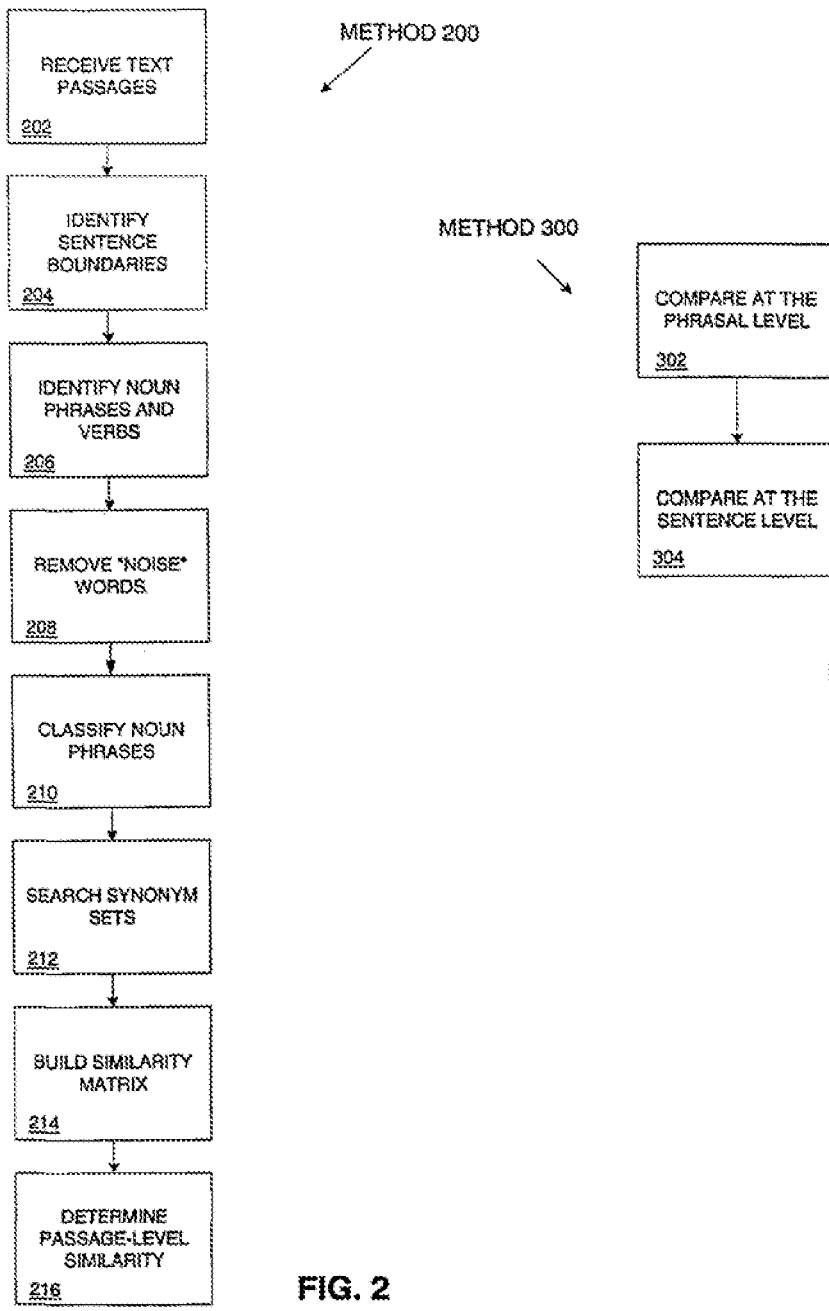

METHOD AND APPARATUS FOR DETERMINING TEXT PASSAGE SIMILARITY

RELATED APPLICATIONS

The present application is a Continuation of the U.S. patent application entitled "METHOD AND APPARATUS FOR DETERMINING TEXT PASSAGE SIMILARITY," filed Aug. 9, 2010, Ser. No. 12/853,034, which is a continuation of U.S. patent application Ser. No. 10/130,858 filed on Oct. 17, 2003, which are incorporated herein by reference.

FIELD

The invention relates to the determination of similarity between text passages. More specifically, the invention related to a method and apparatus for determining text passage similarity based on noun phrase and verb parsing.

BACKGROUND

Due to an increased knowledge base, the number of documents across different subject matter areas continues to grow. For example, with the advent of the Internet and the World Wide Web (WWW), the documents on the different web sites on the Internet continues to expand as the number of networks and servers connected thereto continue to increase on a global scale. Accordingly, the fields of information retrieval, document summarization, information filtering and/or routing as well as topic tracking and/or detection systems continue to grow in order to track and service the vast amount of information.

The determination of the similarities and differences between various text passages plays an important role in such processes. Different approaches are currently being employed in determining similarities and differences between various text passages. Typically, such approaches determine the keywords for the documents being compared and employ a mathematical technique, such as logarithmic frequency, to determine the similarity or differences between the documents. However, such mathematical techniques at times require high dimension vector manipulation in order to determine the similarity between the documents.

BRIEF DESCRIPTION OF THE DRAWINGS

Embodiments of the invention may best be understood by referring to the following description and accompanying drawings which illustrate such embodiments. In the drawings:

FIG. 2 is a flowchart illustrating a method for the determination of the similarity between a number of text passages, according to embodiments of the present invention;

FIG. 3 is a flowchart illustrating a method for the generation of a similarity matrix for the comparison of text passages, according to embodiments of the present invention.

DETAILED DESCRIPTION

In the following description, numerous specific details are set forth to provide a thorough understanding of the invention. However, it is understood that the invention may be practiced without these specific details. In other instances, well-known structures and techniques have not been shown in detail in order not to obscure embodiments of the present invention.

Figure 1:
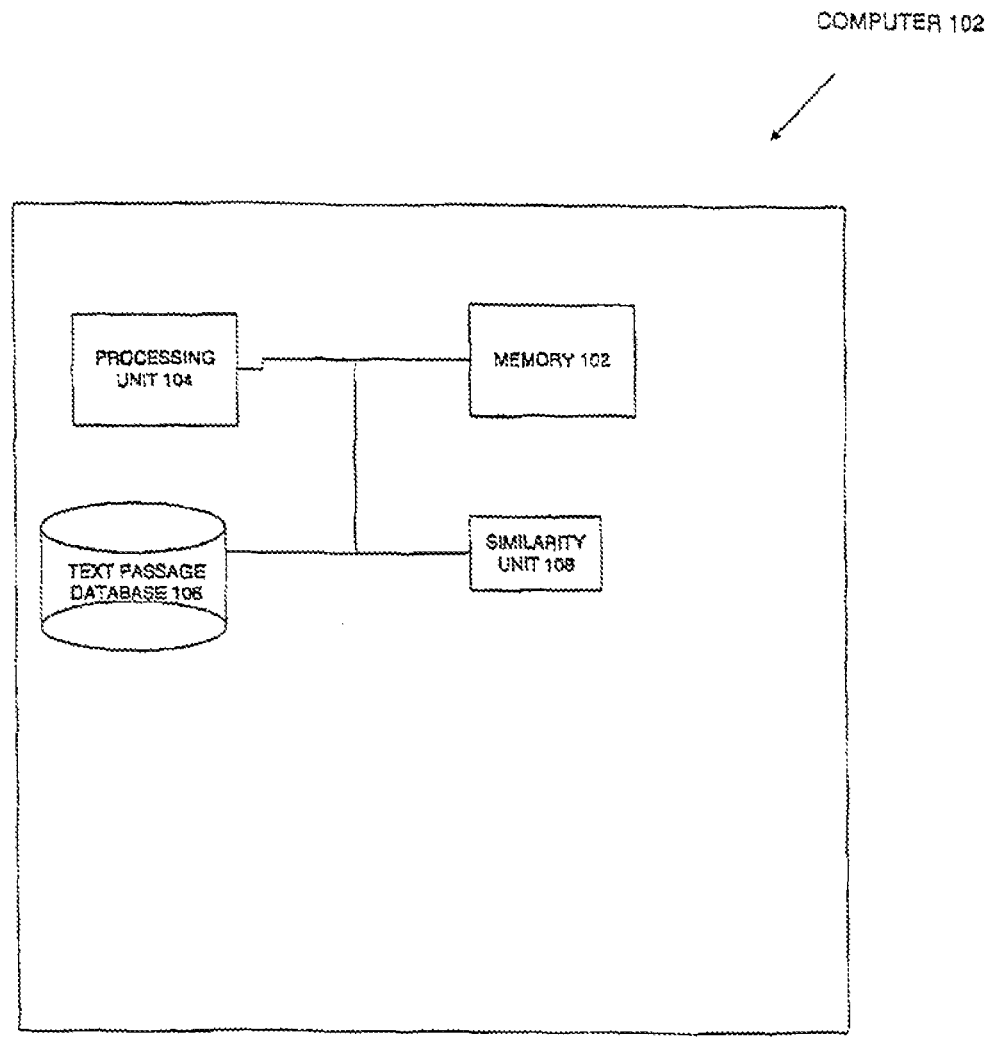
FIG. 1 illustrates a computer that provides for text passage similarity, according to embodiments of the present invention.

FIG. 1 illustrates a computer that provides for text passage similarity, according to embodiments of the present invention. As shown, computer 102 includes processing unit 104, memory 102, text passage database 106 and similarity unit 108, which are coupled together. In one embodiment, similarity unit 108 is a software program that can reside in memory 102 and processing unit 104 during their executing on processing unit 104.

In particular, memory 102 includes a machine-readable medium on which is stored a set of instructions (i.e., software) embodying any one, or all, of the methodologies described herein. Software can reside, completely or at least partially, within memory 102 and/or within processing unit 104. For the purposes of this specification, the term "machine readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Text passage database 106 includes a number of text passages that can be compared for determining similarities there between, according to embodiments of the present invention. Text passage database 106 is shown as being internal to computer 102. However, embodiments of the present invention are not so limited, as text passage database 106 could be external to computer 102. For example, the different text passages could be stored across various servers coupled to computer 102 via a network, such as the Internet.

In conjunction with computer 102 of FIG. 1, a method of operation of computer 102 in accordance with embodiments of the present invention will now be described with reference to the flow chart shown in FIG. 2. In particular, FIG. 2 is a flowchart illustrating a method for the determination of the similarity between two text passages, according to embodiments of the present invention. In one embodiment, similarity unit 108 generates method 200 of FIG. 2. Method 200 is described in terms of similarity determinations between two text passages. However, such a description is for the sake of clarity and not by way of limitation, as embodiments of the present invention can compare more than two text passages.

FIG. 2 illustrates method 200 that commences with the receipt of a number of text passages from text passage database 106 by similarity unit 108, at process block 202. Such text passages are not restricted to a particular language, as embodiments of the present invention can be incorporated into different languages. In an embodiment, similarity unit 108 identifies sentence boundaries within the text passages, at process block 204. Although different techniques can be employed in the identification of sentence boundaries in the text passages. in one embodiment, software applications, as are known in the art, can be employed to identify the sentence boundaries. Accordingly, such a software application can receive the text passages and output the sentence boundaries for the text passages.

Similarity unit 108 identifies the noun phrases in each of the sentences in the text passages, at process block 206. These noun phrases can be of different classifications, which are described in more detail below. Moreover, in one embodiment, similarity unit 108 identifies the core verbs in each of the sentences in the text passages, at process block 206. A core verb can be defined to be the verb in the independent clause for a given sentence. In an embodiment, software applications, as are known in the art, identify the noun phrases and core verbs in each of the sentences in the text passages.

In one embodiment, similarity unit 108 removes "noise" words from the sentences in the different text passages, at process block 208. Noise words are those words that do not carry significant weight in the determination of the similarity between text passages. Examples of such "noise" words could be articles, such as "a", "an", "the", etc. In one such embodiment "noise" words are stored in a list, which can be defined, for example, by data analyst or domain expert.

Similarity unit 108 also classifies the previously identified noun phrases, at process block 210. Although embodiments of the present invention can include different classifications of noun phrases, in one embodiment, the classifications include (1) a single noun, (2) a noun phrase with a noun head, (3) a noun phrase with a head that is not a noun and (4) a noun phrase without a head.

A more detailed explanation of such classifications will now be described. A noun phrase with a noun head is defined to include those noun phrases that have more than one noun, wherein one of the nouns is the main (or head) noun in the phrase. An example of such a noun phrase is "River Park", wherein both "River" and "Park" are nouns but "River" describes the main or head noun "Park." In other words, one noun is dominate and is the focus of the noun phrase as compared to the other nouns in this noun phrase. Moreover, a noun phrase with a head that is not a noun is defined to include those noun phrases having a head that in certain circumstances is not classified as a noun. An example of such a noun phrase includes "the rich" or "the poor", wherein "rich" or "poor" are the heads. Such terms, however, in other circumstances act as an adjective. For example, "the poor people" illustrates a situation wherein the "poor" is functioning as an adjective rather than a noun. Additionally, a noun phrase without a head is defined to include those noun phrases having more than one noun wherein the nouns are equal in nature. In other words, no single noun in the phrase dominates any of the other nouns in the noun phrase. Examples can include organization names having more than one word, such as "Hewlett Packard."

Returning to FIG. 2, in one embodiment, similarity unit 108 retrieves synonyms sets for the core verbs and the nouns in the different noun phrases at process block 212. In one such embodiment, these synonym sets are retrieved from databases of synonyms. Accordingly, in one such embodiment, the given core verb or noun can be entered into a search and a corresponding synonym set can be outputted from such databases using database interface applications, as are known in the art.

Similarity unit 108 generates a similarity matrix based on the noun phrases, core verbs and synonym sets, at process block 214. In particular, FIG. 3 is a flowchart illustrating a method for the generation of a similarity matrix for the comparison of text passages, according to embodiments of the present invention. Method 300 of FIG. 3 commences with the comparison of the two text passages at the phrasal level, at process block 302.

Figure 4:
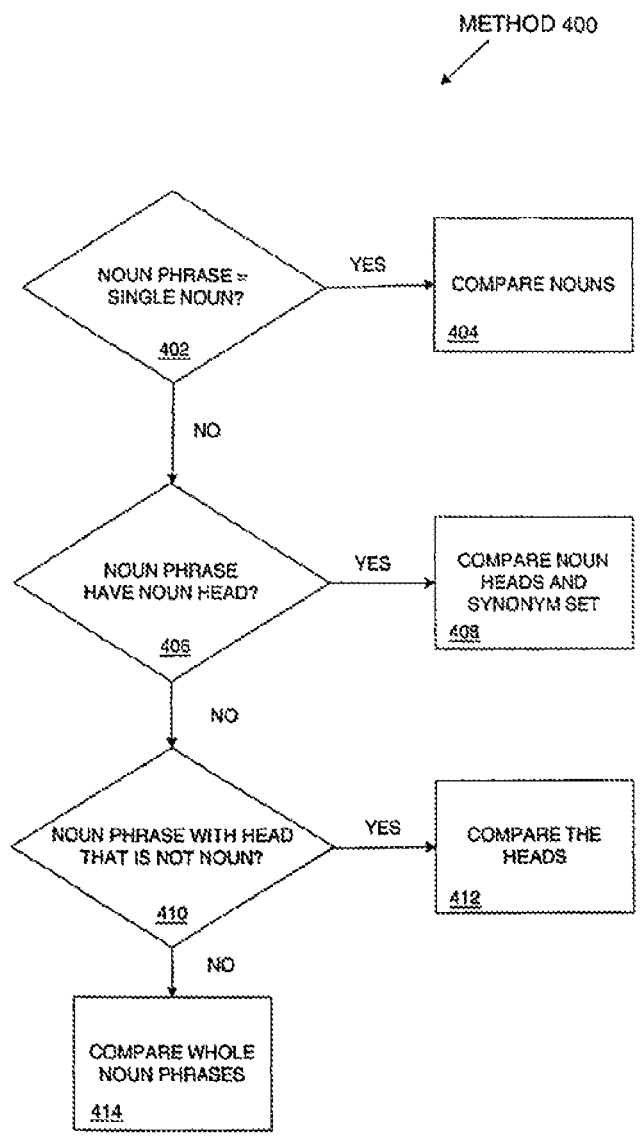
FIG. 4 is a flowchart illustrating a method for comparing the text passages at the noun phrasal level, according to embodiments of the present invention.

In particular, FIG. 4 is a flowchart illustrating a method for comparing the text passages at the noun phrasal level, according to embodiments of the present invention. In an embodiment, each of the noun phrases of the same category from the different text passages is compared. Method 400 of FIG. 4 is described in terms of the comparison of a pair of noun phrases, wherein each noun phrase is from a different text passage. Accordingly in such an embodiment, method 400 is reiterated for each of the noun phrases being compared across the two text passages.

Method 400 of FIG. 4 commences with the determination of whether the two noun phrases being compared are classified as single nouns, by similarity unit 108 at process decision block 402. If the two noun phrases being compared are classified as single nouns, similarity unit 108 compares the two nouns, at process block 404. In one embodiment, the similarity between two noun phrases or verbs (phrases_sim($ph_1$, $ph_2$)) is defined by equation (1) below:

$$\begin{aligned} \text{phrases\_sim}(ph_1, ph_2) &= 1; \quad \text{identical phrases} \\ &= 0; \quad \text{two noun phrases,} \\ &\quad \text{one with head noun and} \\ &\quad \text{the other without the head noun} \\ &= w * O; \quad \text{different values of weight } w \text{ are} \\ &\quad \text{assigned to different pair types} \end{aligned} \quad (1)$$

In an embodiment, the weight w is a value having a range of [0, 1]. Moreover, the different values of weight w depend on the type of phrases being compared. For example, when two single nouns are being compared the weight w has a different value than when two noun phrases having noun heads are being compared. In one such embodiment, the value of w is 1.0 for the comparison of two single nouns. In an embodiment, the value of w is 0.8 for the comparison of two noun phrases having noun heads. Additionally, in one embodiment, the value of w is 0.5 for the comparison of a single noun and a noun phrase with a noun head. Moreover, O, which is the similarity of two synonym sets for the given noun phrases, is their overlap, which is defined by equation (2) below:

$$O = \frac{\_\text{Set } 1\_\text{Set}2\_}{\text{Min}(\_\text{Set}1\_, \_\text{Set}2\_)} \quad (2)$$

In an embodiment, synonym sets are not incorporated into the "single noun" noun phrase comparisons. Accordingly, for such noun phrases, the value will be one if the two nouns are the same and zero otherwise.

Returning to method 400, if the noun phrase is not a single noun, similarity unit 108 determines whether the noun phrase is one that has a noun head that is a noun, at process decision block 406. If the noun phrase does include a noun head, similarity unit 108 compares the noun heads of the noun phrases employing equation (1) shown above, at process block 408. Moreover, in an embodiment, similarity unit 108 also compares the similarity sets for the noun heads using equations (1) and (2) shown above, at process block 408. Accordingly, if the noun heads are identical, the similarity value will be one and will have a lower value depending on the similarity of the synonym sets of the noun heads.

If the noun phrase is not one that has a noun head that is a noun, similarity unit 108 determines whether the noun phrase is one that includes a noun head that is not a noun, at process decision block 410. If the noun phrase does include a noun head that is not a noun, similarity unit 108 compares the noun heads for the two noun phrases using equation (1) shown above, at process block 412. If the noun phrases in the pair are not ones that include a noun head that is not a noun, similarity unit 108 compares the whole noun phrases using equation (1) shown above, at process block 414. In such an embodiment, these noun phrases being compared at process block 414 are noun phrases without a head.

The above-described comparison of noun phrases was described in terms of a given order shown in method 400. However, embodiments of the present invention are not so limited, as other orders can be incorporated in the determination of the noun phrase comparisons. For example, similarity unit 108 could have exchanged process decision blocks 402 and 404. Accordingly, similarity unit 108 would initially determine whether the noun phrases in the pair were ones that included a noun head that was a noun.

With regard to the comparisons of the core verbs in the two different text passages, in one embodiment, each of the core verbs in the first text passage is compared to the core verbs in the second text passage, using equation (1) described above. In one embodiment, the retrieved synonym set for each core verb in the first text passage is compared with the retrieved synonym set for each core verb in the second text passage using equations (1) and (2) described above. In one such embodiment, the value of w is 1.0 for the comparison of two core verbs.

Returning to FIG. 3, the two text passages are compared at the sentence level, at process block 304. In one embodiment, the similarity between two sentences in the two different text passages is compared based on the above-described phrasal level comparison between the two text passages. In one such embodiment, a similarity between two sentences coming from two different text passages is defined by equation (3) below:

$$\mathrm{Sim}(sent_1, sent_2) = (sent\_sim_{1,2} + sent\_sim_{2,1})/2 \quad (3)$$

wherein $sent\_sim_{1,2}$ and $sent\_sim_{2,1}$ are defined by equations (4) and (5) below:

$$sent\_sim_{1,2} = \sum_{(i\ 1\ to\ n1)} \mathrm{Max}_{j\ sent2}[(\mathrm{phrase\_sim}\,(ph_{1,i}, ph_{2,j}))/n1] \quad (4)$$

$$sent\_sim_{2,1} = \sum_{(i=1\ to\ n2)} \mathrm{Max}_{j\_sent1}[(\mathrm{phrase\_sim}\,(ph_{2,i}, ph_{1,j}))/n2] \quad (5)$$

wherein i and j are the number of phrases in sentence 1 and sentence 2, respectively. As shown, the previously determined similarities between the noun phrases and core verbs within the sentences being compared are incorporated into the comparisons at the sentence level.

In an embodiment, a similarity between the two sentences in the two different passages is generated for each of the pair of sentences, such that a similarity matrix is generated for the sentence level comparisons. Therefore, for example, the ith row and the jth column element of such a matrix is noted by: $\mathrm{Sim}(sent_{1,i}, sent_{2,j})$.

Returning to FIG. 2, similarity unit 108 compares the two text passages at the passage level, at process block 216. In one embodiment, the similarity between the two text passages is compared based on the above-described sentence level comparison between the two text passages. In one such embodiment, a similarity between two text passages is defined by equation (6) below:

$$\mathrm{Sim}(passage1, passage2) = (passage\_sim_{1,2} + passage\_sim_{2,1})/2 \quad (6)$$

wherein $passage\_sim_{1,2}$ and $passage\_sim_{2,1}$ are defined by equations (7) and (8) below:

$$passage\_sim_{1,2} = \sum_{(i=1\ to\ n1)} \mathrm{Max}_{j\_sent2}[(sent\_sim(sent_{1,i}, sent_{2,j}))/n1] \quad (7)$$

$$passage\_sim_{2,1} = \sum_{(i=1\ to\ n2)} \mathrm{Max}_{j\_sent1}[(\mathrm{phrase\_sim}(sent_{2,i}, sent_{1,j}))/n2] \quad (8)$$

Accordingly, embodiments of the present invention allow for initial comparisons based on a simple linguistic unit (e.g., a noun phrase or core verb) and provides for comparisons on a larger scale moving from the phrasal level up to the sentence level and passage level comparisons based on the lower level comparisons.

Although the present invention has been described with reference to specific exemplary embodiments, it will be evident that various modifications and changes may be made to these embodiments without departing from the broader spirit and scope of the invention. For example, the description above of the different methods was illustrated in terms of execution by a single unit (similarity unit 108). However, embodiments of the present invention are not so limited, as the execution of the methods described herein can be distributed across multiple units. Accordingly, the specification and drawings are to be regarded in an illustrative rather than a restrictive sense.

What is claimed is:

1. A computer-implemented method comprising:
   receiving, by a computer processor, content of a first text passage and a second text passage;
   based on the received content, automatically identifying, by the computer processor, a plurality of noun phrases in the first text passage and a plurality of noun phrases in the second text passage;
   removing noise words from the first set of phrases;
   after the removing, determining a first similarity between a noun phrase from the first text passage and a noun phrase from the second text passage;
   determining a second similarity between the first text passage and the second text passage based on the first similarity; and
   storing in a computer memory information about the second similarity.

2. The method of claim 1, wherein determining the first similarity further comprises assigning a weight value.

3. The method of claim 1, wherein the computer processor is coupled to a network.

4. The method of claim 3, wherein the network is the internet.

5. The method of claim 3, wherein the content of the first text passage and the content of the second text passage are received from a first server and a second sever, respectively, via the network.

6. The method of claim 1, wherein the second similarity is further determined based on one or more verbs in at least one of the first text passage and the second text passage.

7. A non-transitory computer-readable storage media having stored thereon instructions which when executed by one or more processors, cause the one or more processors to perform a method comprising:
- receiving, by a computer processor, content of a first text passage and a second text passage;
- based on the received content, automatically identifying, by the computer processor, a plurality of noun phrases in the first text passage and a plurality of noun phrases in the second text passage;
- removing noise words from the first set of phrases;
- after the removing, determining a first similarity between a noun phrase from the first text passage and a noun phrase from the second text passage;
- and determining a second similarity between the first text passage and the second text passage based on the first similarity.

8. The computer-readable storage media of claim 7, wherein determining the first similarity further comprises assigning a weight value.

9. The computer-readable storage media of claim 7, wherein the computer processor is coupled to a network.

10. The computer-readable storage media of claim 9, wherein the network is the internet.

11. The computer-readable storage media of claim 9, wherein the content of the first text passage and the content of the second text passage are received from a first server and a second sever, respectively, via the network.

12. The computer-readable storage media of claim 7, wherein the second similarity between the first text passage and the second text passage is further determined based on one or more verbs in at least one of the first text passage and the second text passage.

13. A system comprising:
- a computer having a computer processor and a memory, the computer processor to receive content of a first text passage and a second text passage;
- the processor further to automatically generate, based on the received content, a plurality of noun phrases in the first text passage and a plurality of noun phrases in the second text passage;
- the computer processor further to remove noise words from the first set of phrases;
- the computer processor further to determine, after the removing, a first similarity between a noun phrase from the first text passage and a noun phrase from the second text passage;
- the computer processor further to determine a second similarity between the first text passage and the second text passage based on the first similarity; and
- the memory to store information about the second similarity.

14. The system of claim 13, wherein determining the first similarity further comprises assigning a weight value.

15. The system of claim 13, wherein the computer processor is coupled to a network.

16. The system of claim 15, wherein the network is the internet.

17. The system of claim 15, wherein the content of the first text passage and the content of the second text passage are received from a first server and a second sever, respectively, via the network.

18. The system of claim 13, wherein the second similarity is further determined based on one or more verbs in at least one of the first text passage and the second text passage.

* * * * *